(12) United States Patent
Oh

(10) Patent No.: US 6,662,403 B2
(45) Date of Patent: Dec. 16, 2003

(54) CYCLONE DUST COLLECTING APPARATUS FOR A VACUUM CLEANER

(75) Inventor: Jang-Keun Oh, Kwangju (KR)

(73) Assignee: Samsung Kwangju Electronics Co., Ltd., Kwangju (KR)

(*) Notice: Subject to any disclaimer, the term of this patent is extended or adjusted under 35 U.S.C. 154(b) by 276 days.

(21) Appl. No.: 10/055,102

(22) Filed: Oct. 22, 2001

(65) Prior Publication Data

US 2002/0062531 A1 May 30, 2002

(30) Foreign Application Priority Data

Nov. 6, 2000 (KR) .......................... 2000-65660

(51) Int. Cl.[7] ................................ A47L 9/16
(52) U.S. Cl. ................. 15/353; 15/350; 55/DIG. 3
(58) Field of Search .................... 15/353, 377, 350, 15/351, 352; 55/337, 410, 423, 429, DIG. 3

(56) References Cited

U.S. PATENT DOCUMENTS

| | | | |
|---|---|---|---|
| 4,172,710 A | * 10/1979 | van der Molen | 55/340 |
| 5,350,432 A | * 9/1994 | Lee | 55/408 |
| 5,950,274 A | 9/1999 | Kilström | |
| 6,195,835 B1 | 3/2001 | Song et al. | |
| 6,350,292 B1 | 2/2002 | Lee et al. | |

FOREIGN PATENT DOCUMENTS

| | | |
|---|---|---|
| EP | 1199023 | 4/2002 |
| GB | 2344278 | 6/2000 |
| JP | 1156718 | 3/1999 |
| JP | 157463 | 6/2000 |
| WO | 9959458 | 11/1999 |
| WO | 0049932 | 8/2000 |
| WO | 0049933 | 8/2000 |
| WO | 0105291 | 1/2001 |

* cited by examiner

*Primary Examiner*—Terrence R. Till
(74) *Attorney, Agent, or Firm*—Ladas & Parry

(57) ABSTRACT

A cyclone dust collecting apparatus includes a cyclone body mounted on a telescopic extension pipe of a vacuum cleaner, a cyclone cover and a dust receptacle. The cyclone cover has a cylindrical cover body, one end of which is closed, and a first contaminants path communicating with a first through hole. The dust receptacle is removably coupled to the cyclone cover and has a cylindrical collecting body and a second contaminants path, which communicates with the first contaminants path. The cyclone dust collecting apparatus has a consistently high dust collecting efficiency, regardless of the cleaning position of the vacuum cleaner, and prevents damage to a grill and contamination of the environment.

9 Claims, 4 Drawing Sheets

CYCLONE DUST COLLECTING APPARATUS FOR A VACUUM CLEANER

BACKGROUND OF THE INVENTION

1. Field of the Invention

The present invention relates to a vacuum cleaner, and more particularly, to a cyclone dust collecting apparatus mounted in a telescopic extension pipe of the vacuum cleaner for collecting large particle contaminants from the air that is drawn into the vacuum cleaner.

2. Description of the Related Art

Generally, a cyclone dust collecting apparatus uses centrifugal force to separate particles from a fluid, such as air. The cyclone dust collecting apparatus is widely used in the field because of its simple structure and resistance to high temperatures and pressures. The cyclone dust collecting apparatus collects large particles of contaminants, such as pieces of tissue paper, vinyl scraps or hairs from sucked air, thereby preventing the large particles of contaminants from entering into a paper vacuum cleaner bag. Since the large particles of contaminants do not reach the paper vacuum cleaner bag, the life span of the paper bag is prolonged.

FIG. 1 shows a conventional dust collecting apparatus for a vacuum cleaner.

Referring to FIG. 1, a vacuum cleaner includes a suction brush 4, a telescopic extension pipe 3 and a flexible hose 2. The telescopic extension pipe 3 and the flexible hose 2 connect the suction brush 4 to a cleaner body 1. The vacuum cleaner further includes a paper vacuum cleaner bag 7 for collecting contaminants, a motor (not shown) for generating a suction force, and a cyclone dust collecting apparatus 10 for collecting large particles of contaminants. The cyclone dust collecting apparatus 10 is mounted on one end of the telescopic extension pipe 3.

The vacuum cleaner described above draws air and contaminants through the suction brush 4 and guides them diagonally to a cyclone cover 12, where they are induced into a vortex and the large particles of contaminants are separated from the vortex of air by centrifugal force. The separated contaminants are collected in the cyclone cover 12. The clean air ascends from the bottom of the cyclone cover and is then discharged to the cyclone body 1 through the flexible hose 2.

When the cyclone dust collecting apparatus 10 is accidentally tilted or turned upside down, or when the cyclone dust collecting apparatus 10 is full of contaminants, contaminants in the cyclone cover 12 can return to and block a grill 11 of the cyclone dust collecting apparatus, thereby diminishing its cleaning efficiency.

In addition, when the cyclone cover 12 is filled with contaminants, the cyclone cover 12 must be detached from the vacuum cleaner and its contents removed. Since the grill 11 is exposed to the environment when the cyclone cover 12 is off, contaminants in the grill 11 can contaminate the environment. Furthermore, careless handling by a user can damage the exposed grill 11.

SUMMARY OF THE INVENTION

The present invention has been made to overcome the above mentioned problems of the related art. Accordingly, it is an object of the present invention to provide a cyclone dust collecting apparatus for a vacuum cleaner having a consistently high dust collecting efficiency, regardless of the cleaning position of the vacuum cleaner. It is another object of the present invention to prevent damage to the grill and contamination of the environment, when the cyclone dust collecting apparatus is cleaned.

The above objects of the present invention are accomplished by the cyclone dust collecting apparatus for a vacuum cleaner having a telescopic extension pipe. The cyclone dust collecting apparatus includes a cyclone body for inducing the air in the cyclone body into a vortex, a cyclone cover coupled to the cyclone body for separating by the centrifugal force of the vortex the contaminants from the air, and a dust receptacle for collecting the separated contaminants. The cyclone cover has a cylindrical cover body, one end of which is closed. The cover body includes a first through hole formed in a wall proximate the closed end and a first contaminants path in communication with the first through hole. The dust receptacle includes a cylindrical collecting body having an open end and a closed end and a second contaminants path. The second contaminants path is formed on an outer wall of the open end of collecting body and communicates with the first contaminants path.

It is preferable that the first contaminants path has a width longer than a width of the first through hole formed in a circumference of the cover body.

Also, it is preferable that the cyclone dust collecting further include a supporting unit fixed to the telescopic extension pipe and that a recess is formed in the closed end of the dust receptacle. The supporting unit engages the recess to support the dust receptacle and secure the dust receptacle to the cyclone cover. Here, the supporting unit comprises a fixing member mounted to the telescopic extension pipe, and a protrusion section, which extends from one end of the fixing member and is inserted into the recess.

BRIEF DESCRIPTION OF THE DRAWINGS

The above objects and other features and advantages of the present invention will become readily apparent by reference to the following detailed description when considered in conjunction with the accompanying drawings, in which.

DETAILED DESCRIPTION OF THE PREFERRED EMBODIMENT

Hereinafter, the preferred embodiment of the present invention will be described in detail with reference to the attached drawings.

Figure 1:
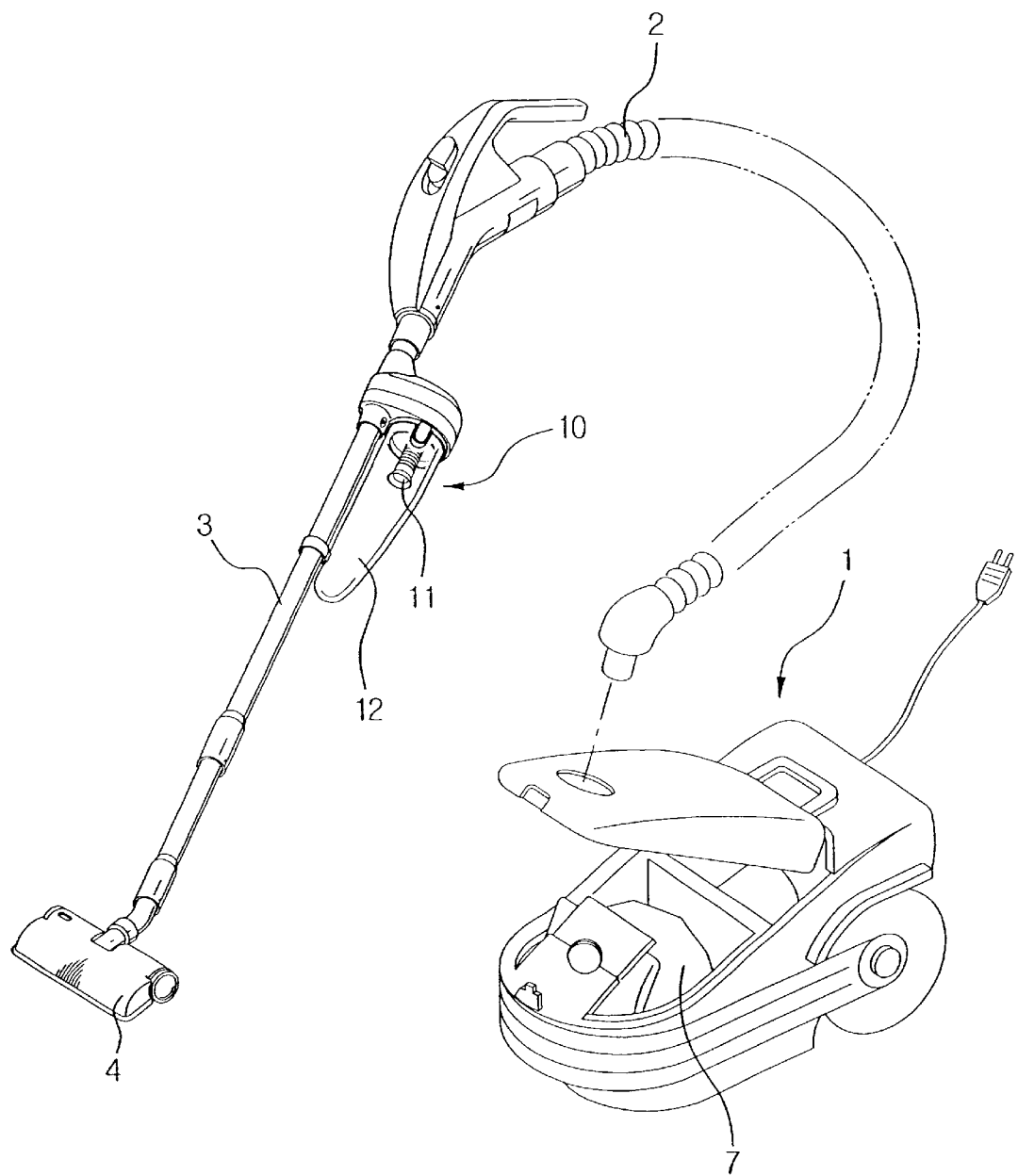
FIG. 1 is a perspective view of a vacuum cleaner having a conventional cyclone dust collecting apparatus.
Figure 2:
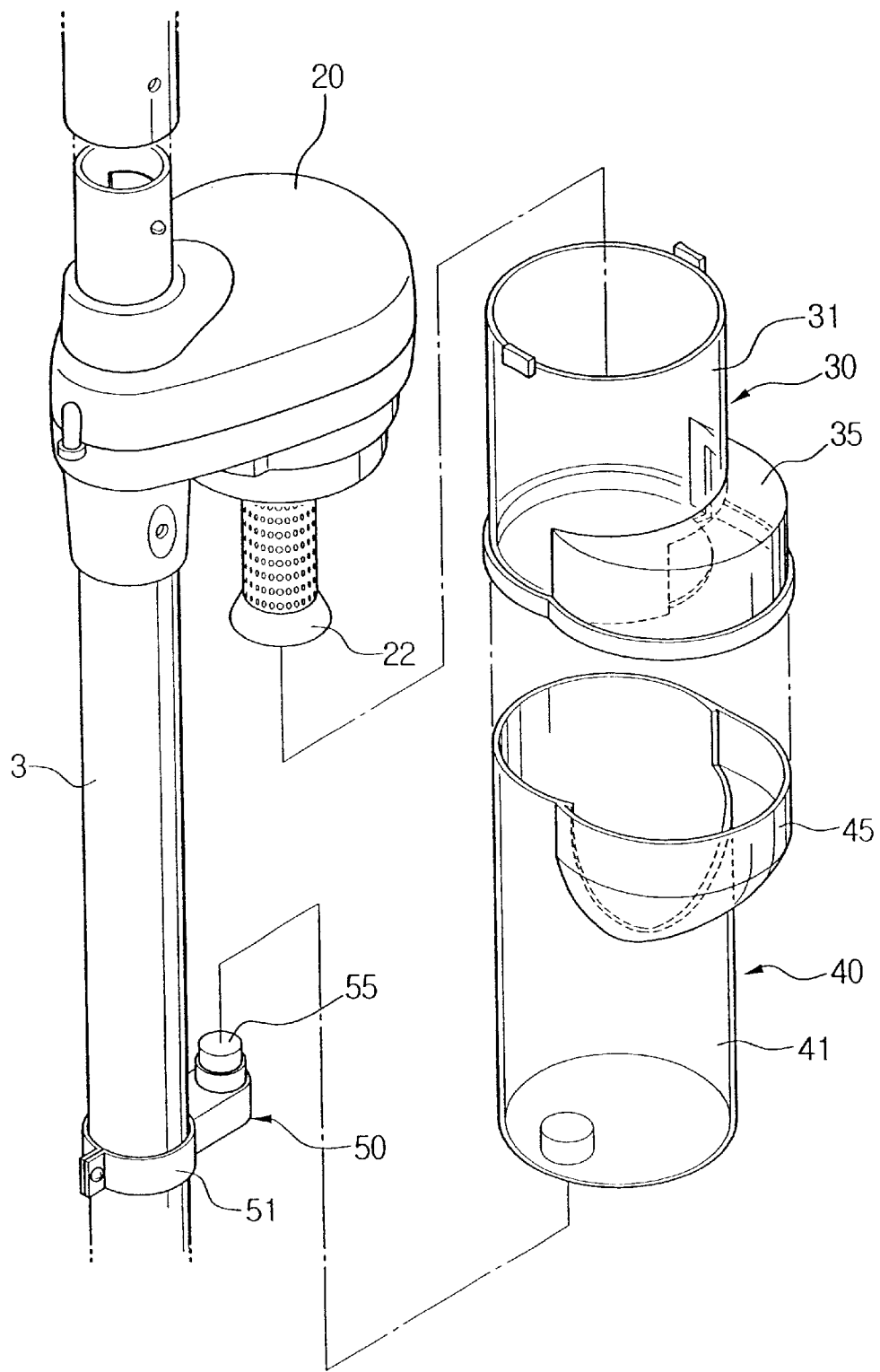
FIG. 2 is an exploded perspective view showing a cyclone dust collecting apparatus in accordance with the present invention.
Figure 3:
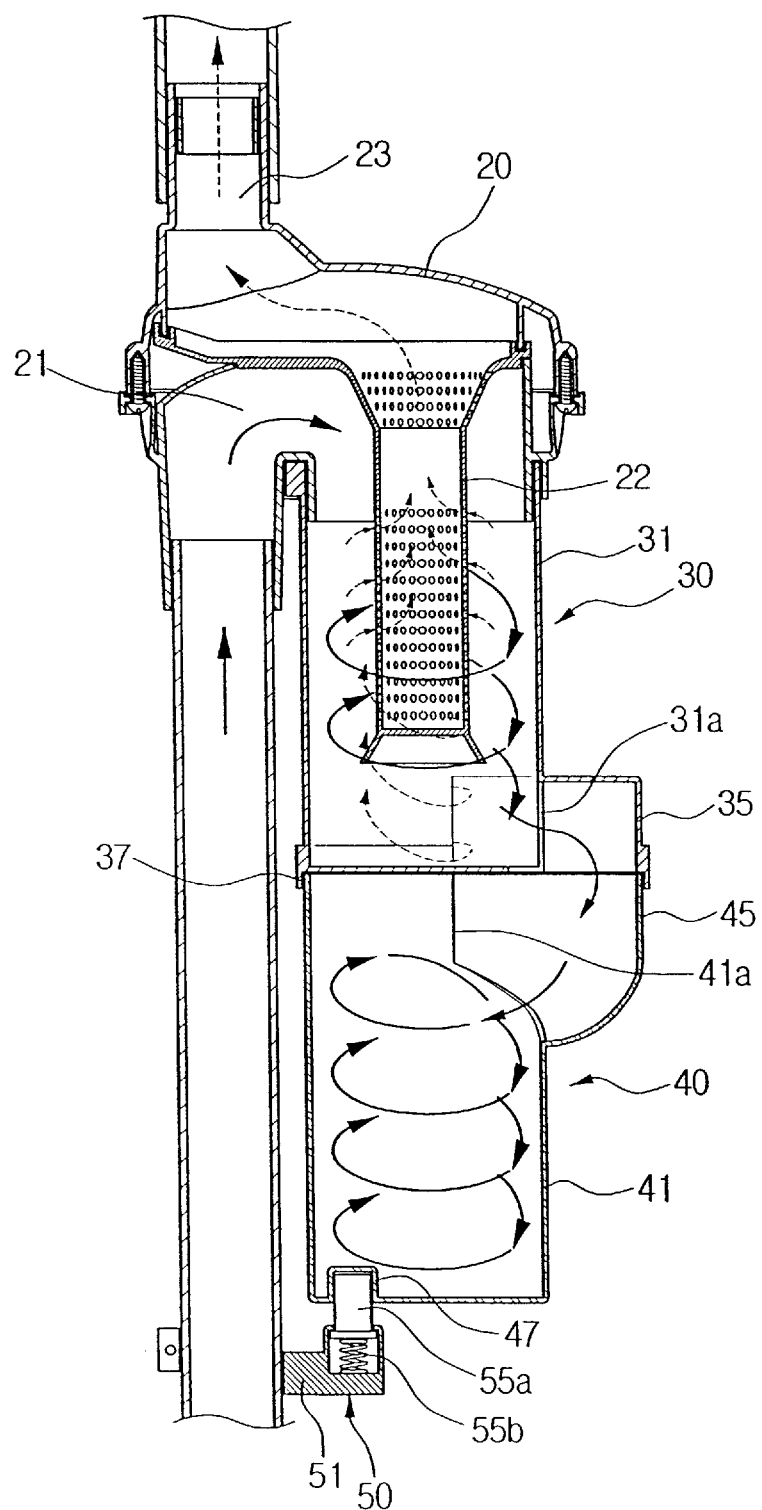
FIG. 3 is a partial sectional view showing the cyclone dust collecting apparatus of FIG. 2 in an assembled state.

Referring to FIGS. 2 and 3, a cyclone dust collecting apparatus has a cyclone body 20, a cyclone cover 30, a dust receptacle 40, and a supporting unit 50 for supporting the dust a receptacle 40. The cyclone body 20, which is mounted on a telescopic extension pipe 3 of the vacuum cleaner, includes an air intake channel 21, a grill 22, and an air discharge channel 23. The air intake channel 21 diagonally draws the air that is sucked in through a suction brush into the cyclone body. The grill 22 filters the air in the cyclone dust collecting apparatus, and the air discharge channel 23 directs the filtered air from the grill 22 to the cleaner body of the vacuum cleaner.

The cyclone cover 30 has a hollow cylindrical cover body 31 for inducing the air that is drawn in through the air intake channel 21 into a vortex, and a first contaminants path 35. The first contaminants path 35 guides the air and contaminants to the dust receptacle 40. An upper end of the cover body 31 is open, while a lower end is closed. A plurality of joint protrusions are formed at the upper end of the cover body 31 for connecting the cover body 31 to the cyclone body 20. A rectangular through hole 31a is formed in the cylindrical wall of the cover body 31 and extends upward from the lower end a predetermined height.

Figure 4:
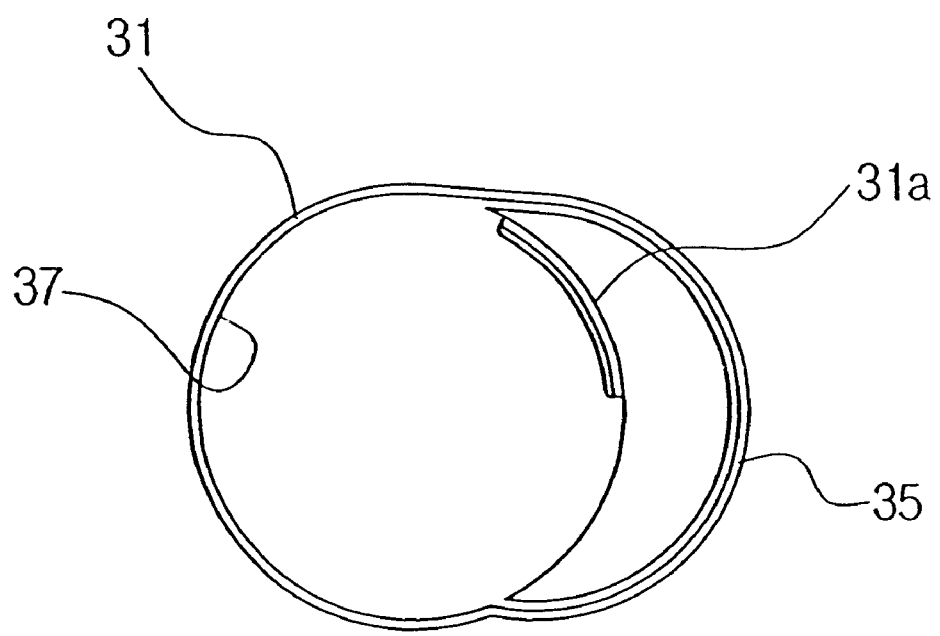
FIG. 4 is a top plan view of the cyclone dust collecting apparatus of FIG. 2.

The first contaminants path 35 has an elbow-shape. One end of the first contaminants path 35 is attached to the cover body 31 and substantially surrounds the first through hole 31a, while the other end is open (Refer to FIGS. 2 and 3). As shown in FIG. 4, a cross section of the first contaminants path 35 is an arc, which has a radius of curvature substantially similar to that of the cover body 31. One end of the arc tangentially makes contact with the outer wall of the body 31 adjacent to one end of the first through hole 31a, while the other end contacts the outer wall of the cyclone body 31 away from the first through hole 31a, the arc of the first contaminants path having an identical radius of curvature of the cyclone body 31.

Although the maximum length that the first through 31a can extend along the outer wall of the cover body 31 is the length between the two contact points of the cover body 31 and the first contaminants path 35, it is preferable that the length of first through hole 31a is one-half of the maximum length. That is, if a diameter of the cover body 31 is 80 cm, the length of the outer wall of the cover body 31 between the contact points of the first contaminants path 35 is approximately 120 cm. Accordingly, the length of the first through hole 31a is preferably 60 cm. The length of the first through hole 31a can be further adjusted according to the size of the cover body 31 and volume of the contaminants discharged through the first through 31a.

The lower end of the cover body 31 and the open end of the first contaminants path 35 are stepped formed for connection to the dust receptacle 40.

The dust receptacle 40 collects contaminants discharged through the first contaminants path 35. The dust receptacle 40 has a cylindrical collecting body 41 and a second contaminants path 45, which is securely connected to the open end of the first contaminants path 35.

The collecting body 41 has an open upper end, in which a second through hole 41a is formed, while a closed lower end has a recess 47 formed on a lower surface thereof.

A cross section of the second contaminants path 45 has a shape identical to that of the first contaminants path 35, and is of adequate size to be securely joined with the first contaminants path 35 to prevent any leakage of air from the cyclone dust collecting apparatus.

As shown in FIGS. 2 and 3, a contacting portion of an outer wall of the collecting body 41 with the second contaminants path 45 defines as the second through hole 41a. The second through hole 41a extends from the contacting portion with a consistently increasing ratio to an open upper end of the second contaminants path 45 (refer to FIG. 2), to guide contaminants discharged through the first contaminants path 35 to the collecting body 41.

The recess 47 that is formed in the lower surface of the closed end of the collecting body 41 has a size corresponding to that of a protrusion section 55 of a supporting unit 50. The recess 47 receives the protrusion section 55 to secure the dust receptacle 40 to the telescopic extension pipe 3.

The supporting unit 50 includes a fixing member 51 that is mounted to the telescopic extension pipe 3. As discussed above, the protrusion section 55 is inserted into the recess 47 of the collecting body 41 to secure the dust receptacle 40 to the telescopic extension pipe. A circular clamp having a size corresponding to an outer circumference of the telescopic extension pipe 3 is formed on one end of the fixing member 51, and fixed to the telescopic extension pipe 3. The protrusion section 55 is formed on the other end of the fixing member 51.

The protrusion section 55 has a protrusion pin 55a, which is inserted into the recess 47 of the collecting body 41, and a spring 55b for elastically supporting the protrusion pin 55a. The size of the protrusion pin 55a is determined in such a manner that the dust receptacle 40 can be detached from the cyclone cover 30 when a user manually pushes down on the dust receptacle 40. During a normal cleaning operation of the vacuum cleaner, the spring 55b biases the protrusion pin 55a upward into engagement with the recess 47 of the collecting body 41, so that the dust receptacle will not detach from the cyclone cover 30 during the cleaning process.

Hereinafter, an operation of the cyclone dust collecting apparatus will be described in detail with reference to the attached drawings.

First, air and contaminants are drawn in through the suction brush 4 and into the air intake channel 21 of the dust collecting apparatus. The air intake channel 21 induces the air and contaminants into a vortex in the cyclone cover 30. The vortex has a centrifugal force, which separates large particles of contaminants from the air, and the large particles of contaminants descend in the cyclone cover 30. Next, the clean air ascends from the bottom of the cyclone cover 30 and is discharged through the grill 22, the air discharge channel 23, and into the cleaner body.

Meanwhile, the descending contaminants that have been separated from the vortex of air are discharged through the first through hole 31a, the first contaminants path 35, the second contaminants path 45, and into the dust receptacle 35. Since the lower end of the cover body 31 is closed, the contaminants continue to spin inside the dust receptacle 40 due to the vortex flow.

The cyclone cover 30 in cooperation with the cyclone body 21 induce the air and contaminants into a vortex in the cyclone body 21 to separate large particles of contaminants from the air by centrifugal force. The first and second contaminants paths 35 and 45 guide the separated contaminants to the dust receptacle 40, where the contaminants are collected.

Hereinafter, an operation for emptying the dust receptacle 40 when the dust receptacle 40 is full will be described. First, a user manually pushes down on the dust receptacle 40 to depress the protrusion section 55 of the supporting unit 50, thereby compressing the spring 55b and disengaging the dust receptacle 40 from the cyclone cover 30. After the user has emptied out the dust receptacle 40, the user reinserts the protrusion pin 55a into the recess 47, pushes the dust receptacle 40 downward, repositions the upper end of the dust receptacle 40 with respect to the cyclone cover 30, and releases the dust receptacle 40. The dust receptacle 40 is then reconnected with the cyclone cover 30 and supported by the protrusion section 55.

According to the present invention, the cyclone dust collecting apparatus for a vacuum cleaner has a consistently high dust collecting efficiency, regardless of the cleaning position of the vacuum cleaner. In addition, the cyclone dust collecting apparatus prevents damage to the grill and contamination of the environment while being emptied.

The present invention has been particularly shown and described with reference to a preferred embodiment thereof. It will be understood by those skilled in the art that various changes in form and details may be effected therein without departing from the spirit and scope of the invention, as defined by the appended claims.

What is claimed is:

1. A cyclone dust collecting apparatus for a vacuum cleaner having a telescopic extension pipe, the cyclone dust collecting apparatus comprising:
   a cyclone body mounted on the telescopic extension pipe of the vacuum cleaner for inducing air and contaminants into a vortex;
   a cyclone cover coupled to the cyclone body for separating contaminants from the air by centrifugal force, a cyclone cover including a cylindrical cover body and a first contaminants path, the cylindrical cover body having an open end and a closed end and a first through hole formed in a wall of the cover body proximate the closed end, the first contaminants path communicating with the first through hole; and
   a dust receptacle in communication with the first through hole, the dust receptacle including a cylindrical collecting body having an open end and a closed end, and a second contaminants path formed on an outer wall of the open end, the second contaminants path corresponding to the first contaminants path.

2. The cyclone dust collecting apparatus as claimed in claim 1, wherein the first contaminants path has a length longer than a length of the first through hole formed in the wall of the cover body.

3. The cyclone dust collecting apparatus as claimed in claim 1, wherein the dust receptacle has a recess formed in the closed end of the dust receptacle.

4. The cyclone dust collecting apparatus as claimed in claim 1 further comprising a supporting unit mounted to the telescopic extension pipe.

5. The cyclone dust collecting apparatus as claimed in claim 4, wherein the supporting unit comprises:
   a fixing member mounted on the telescopic extension pipe; and
   a protrusion section extending from an end of the fixing member, the protrusion section being received by the recess of the dust receptacle to secure the dust receptacle to the telescopic extension pipe.

6. A vacuum cleaner comprising:
   a cleaner body;
   a suction brush coupled to the cleaner body via a telescopic extension pipe and a flexible hose; and
   a cyclone dust collecting apparatus mounted to the telescopic extension pipe including:
      a cyclone body for inducing air and contaminants into a vortex;
      a cyclone cover coupled to the cyclone body, the cyclone cover including a cylindrical cover body and a first contaminants path, the cover body having an open end and a closed end and a first through holed formed in a wall of the cover body proximate the closed end, the first contaminants path communicating with the first through hole; and
      a dust receptacle removably coupled to the cyclone cover, the dust receptacle including a cylindrical collecting body having an open end and a closed end, and a second contaminants path in communication with the first contaminants path.

7. The vacuum cleaner as claimed in claim 6, wherein the first contaminants path has a length longer than a length of the first through hole formed in the wall of the cover body.

8. The vacuum cleaner as claimed in claim 6, wherein the cyclone dust collecting apparatus further includes a supporting unit mounted to the telescopic extension pipe, the supporting unit supporting the dust receptacle in connection with the cyclone cover.

9. The vacuum cleaner as claimed in claim 8, wherein a recess is formed in the closed end of the dust receptacle, and wherein the supporting unit includes a pin and a spring, the spring biasing the pin into engagement with the recess to support the dust receptacle and secure the dust receptacle to the cyclone cover.

* * * * *